(12) United States Patent
Goia et al.

(10) Patent No.: US 8,758,477 B2
(45) Date of Patent: Jun. 24, 2014

(54) AQUEOUS-BASED METHOD FOR PRODUCING ULTRA-FINE METAL POWDERS

(75) Inventors: Dan V Goia, Potsdam, NY (US); Daniel Andreescu, Potsdam, NY (US); Christopher Eastman, Adams, NY (US)

(73) Assignee: Clarkson University, Potsdam, NY (US)

(*) Notice: Subject to any disclaimer, the term of this patent is extended or adjusted under 35 U.S.C. 154(b) by 1010 days.

(21) Appl. No.: 12/168,661

(22) Filed: Jul. 7, 2008

(65) Prior Publication Data
US 2008/0305353 A1    Dec. 11, 2008

Related U.S. Application Data

(62) Division of application No. 10/978,153, filed on Oct. 29, 2004.

(51) Int. Cl.
| B22F 1/00 | (2006.01) |
| B22F 9/00 | (2006.01) |
| C21B 15/04 | (2006.01) |
| C22B 5/20 | (2006.01) |
| C22C 1/04 | (2006.01) |

(52) U.S. Cl.
USPC .............................. 75/371; 75/255

(58) Field of Classification Search
USPC .................. 428/842; 75/371, 255
See application file for complete search history.

(56) References Cited

U.S. PATENT DOCUMENTS

| 5,246,481 A * | 9/1993 | Scheie ........................ 75/374 |
| 6,274,284 B1 * | 8/2001 | Aylward et al. ............... 430/97 |
| 6,660,058 B1 * | 12/2003 | Oh et al. ....................... 75/351 |
| 2005/0229334 A1 | 10/2005 | Huang et al. |

OTHER PUBLICATIONS

Goia et al. (New Journal of Chemistry, 1998, pp. 1203-1215).*
Lee et al. (Colloids and Surfaces A 210 (2002) 49-60).*

* cited by examiner

*Primary Examiner* — Weiping Zhu
(74) *Attorney, Agent, or Firm* — George R. McGuire; Blaine T. Bettinger; Bond Schoeneck & King, PLLC

(57) ABSTRACT

The present invention provides a method for forming compositions having a plurality of ultra-fine metallic particles, and the metallic composition produced therewith. Also provided is a substrate coated with the plurality of ultra-fine metallic particles obtained in accordance with the method of the present invention.

23 Claims, 4 Drawing Sheets

US 8,758,477 B2

AQUEOUS-BASED METHOD FOR PRODUCING ULTRA-FINE METAL POWDERS

CROSS-REFERENCE TO RELATED APPLICATIONS

This application is a divisional application of U.S. patent application Ser. No. 10/978,153, filed Oct. 29, 2004, the disclosure of which is hereby incorporated by reference in its entirety.

FIELD OF THE INVENTION

The present invention relates generally to ultra-fine metallic compositions and methods of making thereof. The present invention further relates to methods of coating various substrates with the ultra-fine metallic compositions.

BACKGROUND OF THE INVENTION

Ultra-fine metallic particles have many unique physical and chemical characteristics, which make them ideal materials for a variety of applications, such as electronics, catalysis, metallurgy, and decorations. Compared to the various particle-producing techniques used in the art, the methods based on the chemical precipitation in solutions provide several advantages, e.g., low manufacturing cost and a very good control of the mechanism of metal particles formation. Others in the art have successfully prepared micron and submicron-size metallic powders of Co, Cu, Ni, Pb, and Ag using chemical-based techniques, such as the ones based on the reduction in alcohols or polyols. For example, U.S. Pat. No. 4,539,041 discusses a method for producing micrometer-size metallic particles by using polyols to convert various metallic compounds into metal powders. Nonetheless, these processes require complex equipment and the metallic powders produced are generally more expensive because of the cost of the organic solvents used. The present invention provides a process capable of generating cost effectively highly dispersed crystalline ultra-fine metallic particles in aqueous medium, which are highly desirable in many practical applications, especially in electronics.

SUMMARY OF THE INVENTION

The present invention provides a method for forming compositions having a plurality of ultra-fine metallic particles, and the metallic composition produced therewith, where the plurality of ultra-fine metallic particles is obtained in accordance with a process including:
  (a) obtaining a reducing solution comprising a reducing agent and a stabilizing agent;
  (b) obtaining a metal-ammonia solution containing a metal-ammonia complex;
  (c) forming a reaction mixture containing the reducing solution and the metal-ammonia solution;
  (d) maintaining the reaction mixture under a suitable condition for a time effective to reduce the metal-ammonia complex to metallic particles; and optionally,
  (e) isolating the metallic particles.

In one embodiment of the present invention, the metal-ammonia complex is the complex of ammonia with a transition metal or a noble metal, e.g., Cu, Pd, and Ag, formed by reacting a solution comprising a metal salt with ammonium hydroxide or ammonia. In another embodiment, the reducing agent is a saccharide, such as D-glucose. In yet another embodiment, the stabilizing agent is a water-soluble resin (e.g., a natural occurring, synthetic, or semi-synthetic water-soluble resin) or gum arabic. The gum arabic may be removed during the isolation of the metallic particles through hydrolysis. The plurality of ultra-fine metallic particles may have at least one desirable feature, such as tight size distribution, low degree of agglomeration, high degree of crystallinity, ability to re-disperse fully into a liquid (e.g. an aqueous solution) to form stable dispersions.

In another aspect, the present invention provides a substrate coated with the plurality of ultra-fine metallic particles obtained in accordance with the method disclosed herein.

Additional aspects of the present invention will be apparent in view of the description that follows.

BRIEF DESCRIPTION OF THE FIGURES

FIG. 4 shows the X-ray diffraction patterns of silver particles shown in FIG. 2 a.

DETAILED DESCRIPTION OF THE INVENTION

Figure 1:
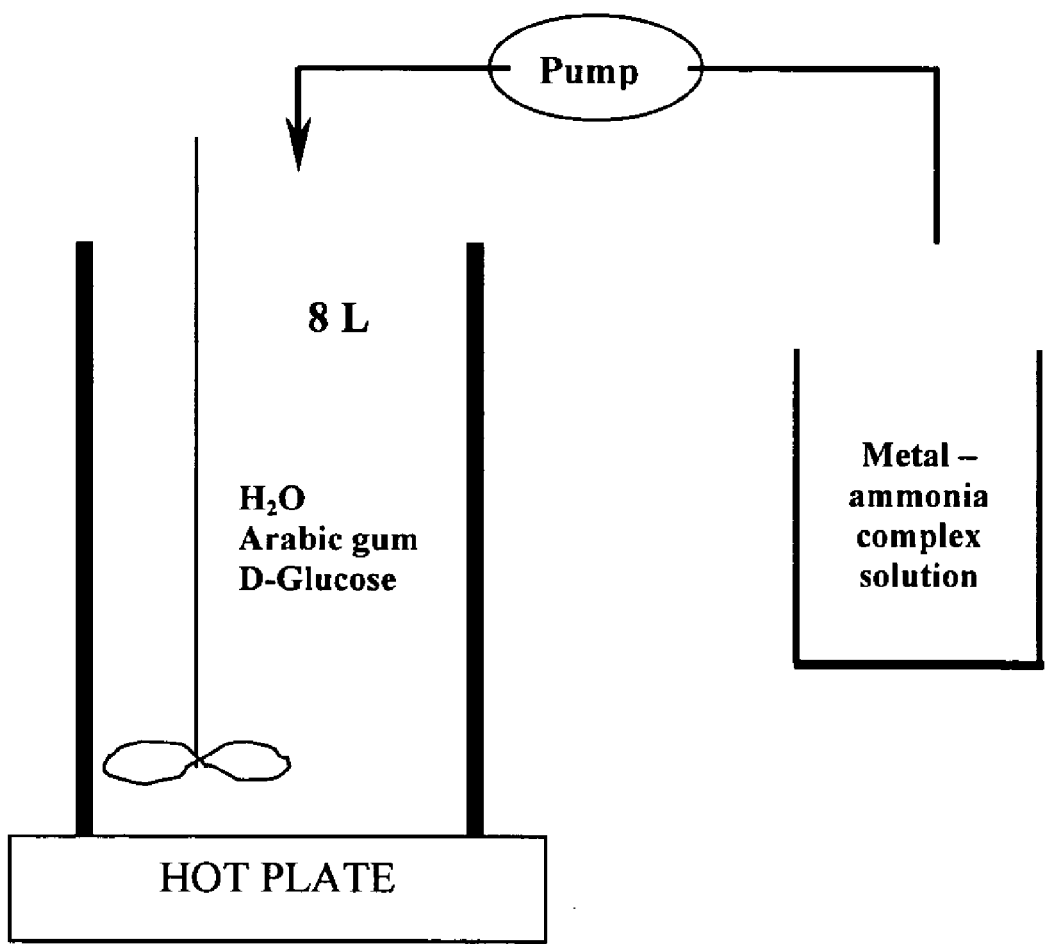
FIG. 1 depicts an experimental set-up used in the synthesis of ultra-fine silver particles.
Figure 2:
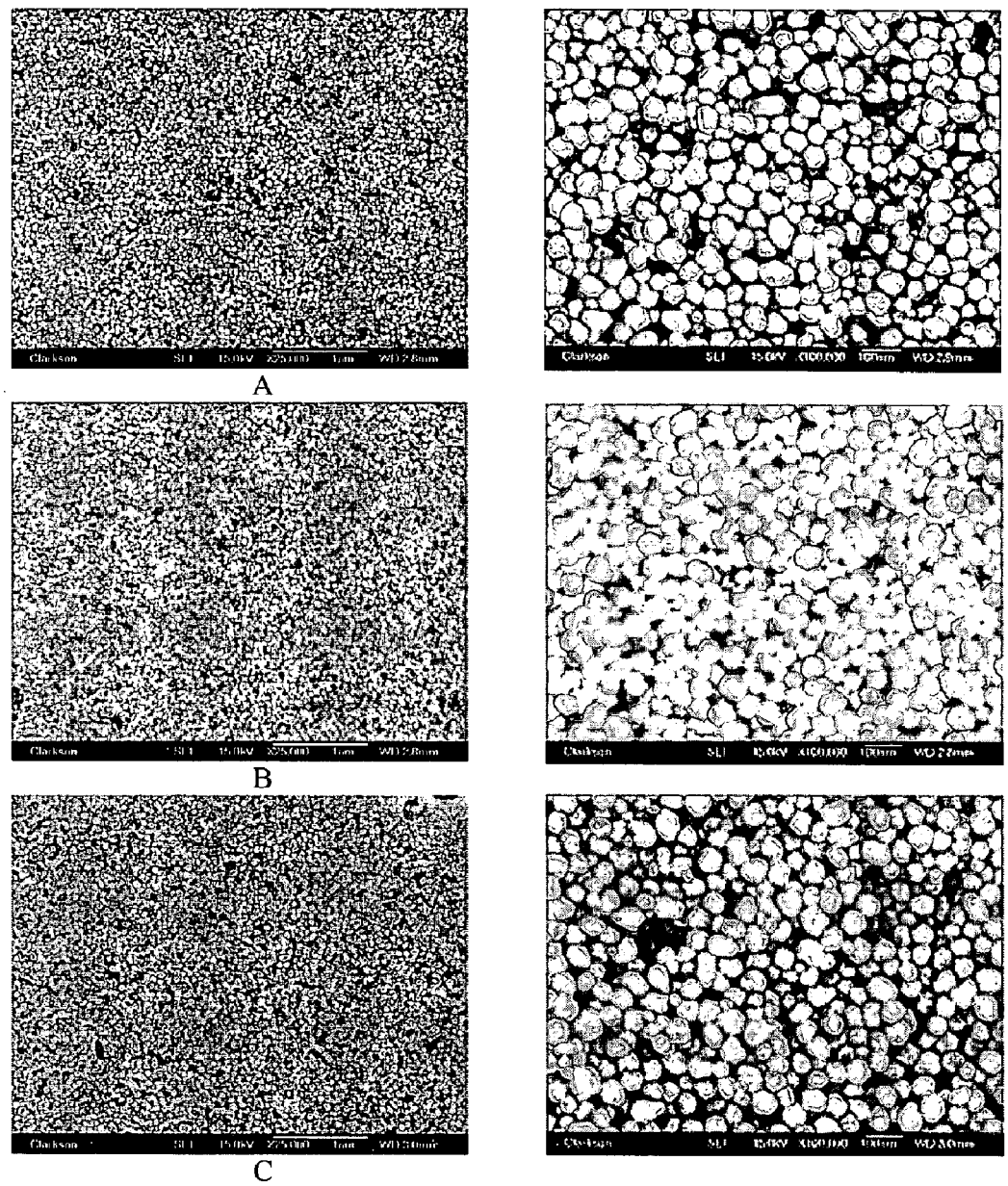
FIG. 2 shows the FE-SEM images of ultra-fine silver particles produced using the method of the present invention. (a) 198.7 g $AgNO_3$ and flow rate at 8 ml/min; (b) 382 g $AgNO_3$ and flow rate at 8 ml/min; and (c) 382 g $AgNO_3$ and flow rate at 30 ml/min. Images were acquired using a FE-SEM at two magnifications (25,000 and 100,000).

As used herein and in the appended claims, the singular forms "a," "an," and "the" include plural references unless the content clearly dictates otherwise. Thus, for example, reference to "a particle" includes a plurality of such particles and equivalents thereof known to those skilled in the art, and reference to "the reducing agent" is a reference to one or more reducing agent and equivalents thereof known to those skilled in the art, and so forth. All publications, patent applications, patents, and other references mentioned herein are incorporated by reference in their entirety.

The present invention generally provides a simple and more cost effective chemical based method for producing highly dispersed ultra-fine metallic powders than those known in the art. The present invention also provides ultra-fine metallic particles having at least one desirable feature, such as tight size distribution, low degree of agglomeration, high degree of crystallinity, ability to re-disperse fully into a liquid (e.g. an aqueous solution) to form stable dispersions.

In at least one embodiment of the invention, the present invention provides a method or system beneficially produces metallic powders, and also metallic powders produced therewith, that include a plurality of ultra-fine metallic particles obtained by (a) obtaining a reducing solution containing a reducing agent and a stabilizing agent; (b) obtaining an aqueous solution containing a metal-ammonia complex; (c) forming a reaction mixture containing the reducing solution and the aqueous solution of step (b); (d) maintaining the reaction mixture under a suitable condition (e.g. pH) for a time effective to reduce the metal-ammonia complex to metallic particles; and optionally, (e) isolating the metallic particles.

The process of the present invention may be used to manufacture ultra-fine particles of various metals, such as Ag, Au, Co, Cr, Cu, Fe, Ir, Mo, Ni, Nb, Os, Pd, Pt, Re, Rh, Ru, Sn, Ta, Ti, V, and W, and alloys or composites containing these metals. The metal-ammonia complex may be mixed with a reducing composition or agent, which converts the metal ions to ultra-fine metal particles under various reaction conditions.

The metal-ammonia complex used in the process of the present invention may be the complex of ammonium with a variety of metals, including, without limitation, transitional metals and noble metals, such as, Ag, Au, Co, Cr, Cu, Fe, In, Ir, Mn, Mo, Ni, Nb, Os, Pd, Pt, Re, Rh, Ru, Sn, Ta, Ti, V, W, Zn, and the combinations thereof. In one embodiment, the metal-ammonia complex may be obtained by reacting a solution containing a metal salt with ammonium hydroxide or ammonia. For example, 198.7 g $AgNO_3$ is dissolved in 234 ml DI water in a 2 L glass beaker. After the silver nitrate is completely dissolved, 195 ml ammonium hydroxide is added into the silver nitrate solution under stirring. 291 ml DI water is then added and the overall volume of the silver ammonia solution is 720 ml. This solution may be covered with plastic wrap (to avoid the ammonia evaporation) and protected with aluminum foil (to prevent the exposure to light).

The term "reducing composition" or "reducing agent," as used herein and in the appended claims, generally includes any reducing substance, and a combination thereof, which is capable of reducing metal ions to metallic particles, such as, without limitation, alcohol, aldehydes, aldose, monohydroxylic alcohols, polyhydroxylic alcohols (polyols), hydrazine hydrate, and reducing saccharides (including, e.g., monosaccharides, oligosaccharides, and polysaccharides). Examples of reducing saccharides include, but not limited to, glyceraldehydes, erythrose, threose, ribose, arabinose, xylose, lyxose, allose, altrose, glucose, dextrose, mannose, gulose, idose, galactose, talose, lactose, maltose, isomaltose, cellobiose, and starch. The nature of the reducing species and their composition in the process of the present invention may be commanded by the particular reaction/metallic element.

The term "stabilizing composition" or "stabilizing agent," as used herein and in the appended claims, generally includes any stabilizing substance, such as, without limitation, water soluble resins (including, e.g., naturally occurring, synthetic, and semi-synthetic water soluble resins), gum arabic, polymers, polysaccharides, glycoproteins, nucleic acids, various salts of naphthalene sulphonic-formaldehyde co-polymers, and a combination thereof, which is capable of dispersing and stabilizing the newly formed ultra-fine metallic particles in the reaction mixture and thus preventing undesirable aggregation of these particles such that the size of the resulting metallic particles is less than about 10 μm, preferably, less than about 1 μm, and more preferably, less than about 100 nm. As used herein and in the appended claims, the term "ultra-fine particles" generally includes particles having diameters of less than about 10 μm, preferably, less than about 1,000 nm, and more preferably, less than about 500 nm, and even more preferably, less than about 100 nm. The ultra-fine metallic particles may be the metallic particles of various metals, including, without limitation, transitional metals and noble metals, such as, Ag, Au, Co, Cr, Cu, Fe, In, Ir, Mn, Mo, Ni, Nb, Os, Pd, Pt, Re, Rh, Ru, Sn, Ta, Ti, V, W, Zn, and the combinations thereof.

The stabilizing composition used in the process of the present invention may be commanded by the particular reaction. Examples of suitable stabilizing agents include, without limitation, gum arabic, cellulose derivatives (e.g., carboxymethyl cellulose, carboxyethyl cellulose, methyl cellulose, etc.) and modified products thereof, polyvinyl alcohol and derivatives thereof, polyvinyl pyrrolidone, polyacrylamide and copolymers thereof, acrylic acid copolymers, vinylmethyl ether-maleic anhydride copolymers, vinyl acetate-maleic anhydride copolymers, various salts of naphthalene sulphonic-formaldehyde co-polymers, styrene-maleic anhydride copolymers, calcined dextrin, acid-decomposed dextrin, acid-decomposed etherified dextrin, agarose, and salmon sperm DNA. In one embodiment of the present invention, the stabilizing agent may be gum arabic. In another embodiment of the present invention, the stabilizing agent is a salt of naphthalene sulphonic-formaldehyde co-polymer.

The stabilizing agent, such as gum arabic, may be removed after the reaction. A number of protocols for removing the stabilizing agent are known in the art, such as, acid, alkaline, and/or enzymatic hydrolysis. In one embodiment, gum arabic may be removed from the reaction mixture after the reaction through alkaline hydrolysis. For example, the hydrolysis may be performed for extended time at high temperature (e.g. between 70° and 100° C., or between 80° and 90° C., or between 82° and 88° C.) and high pH (e.g. pH 11.5). It is generally desirable to maintain the pH of the mixture during the hydrolysis at between 9 and 14, or between 10 and 12, or between 10.5 and 11.5. The duration of the hydrolysis may be commanded by a number of facts, such as, the amount of stabilizing agent (e.g. gum arabic) used. In one embodiment, the hydrolysis of the gum may generally be performed for about 0.2 to 10 hours, or about 1 to 5 hours, or about 2 to 3 hours. The resulting ultra-fine metal particles may be obtained following standard protocols known in the art, such as by precipitation, filtration, and centrifugation. The particles may further be washed, such as by using methanol or ethanol, and dried, such as by air, $N_2$, or vacuum.

The ultra-fine metallic particles may also have at least one desirable feature, such as, tight size distribution, low degree of agglomeration, high degree of crystallinity, ability to redisperse fully into a liquid (e.g. an aqueous solution) to form stable dispersion, or a combination thereof.

Unlike other metallic powders appearing in the art, in one embodiment, the system of the present invention produces metallic powders that include ultra-fine metallic particles, particularly, isometric ultra-fine metallic particles, that have a tight size distribution. The breadth of the size distribution, as used herein, generally refers to the degree of variation in the diameter of the ultra-fine metallic particles in a metallic composition. Tight, used in this context, indicates a relatively small variation in the size of the ultra-fine particles. In one embodiment, the ultra-fine metallic particles are deemed to have a tight size distribution when the diameters of at least about 80%, preferably, at least about 85%, and more preferably, at least about 95%, of the ultra-fine metallic particles of the present invention are within the range of N±15% N, where N is the average diameters of the ultra-fine metallic particles. The diameters of the ultra-fine metallic particles may be measured by a number of techniques, such as, by an electron microscope, particularly, a scanning electron microscope (e.g. field emission scanning electron microscope).

Figure 3:
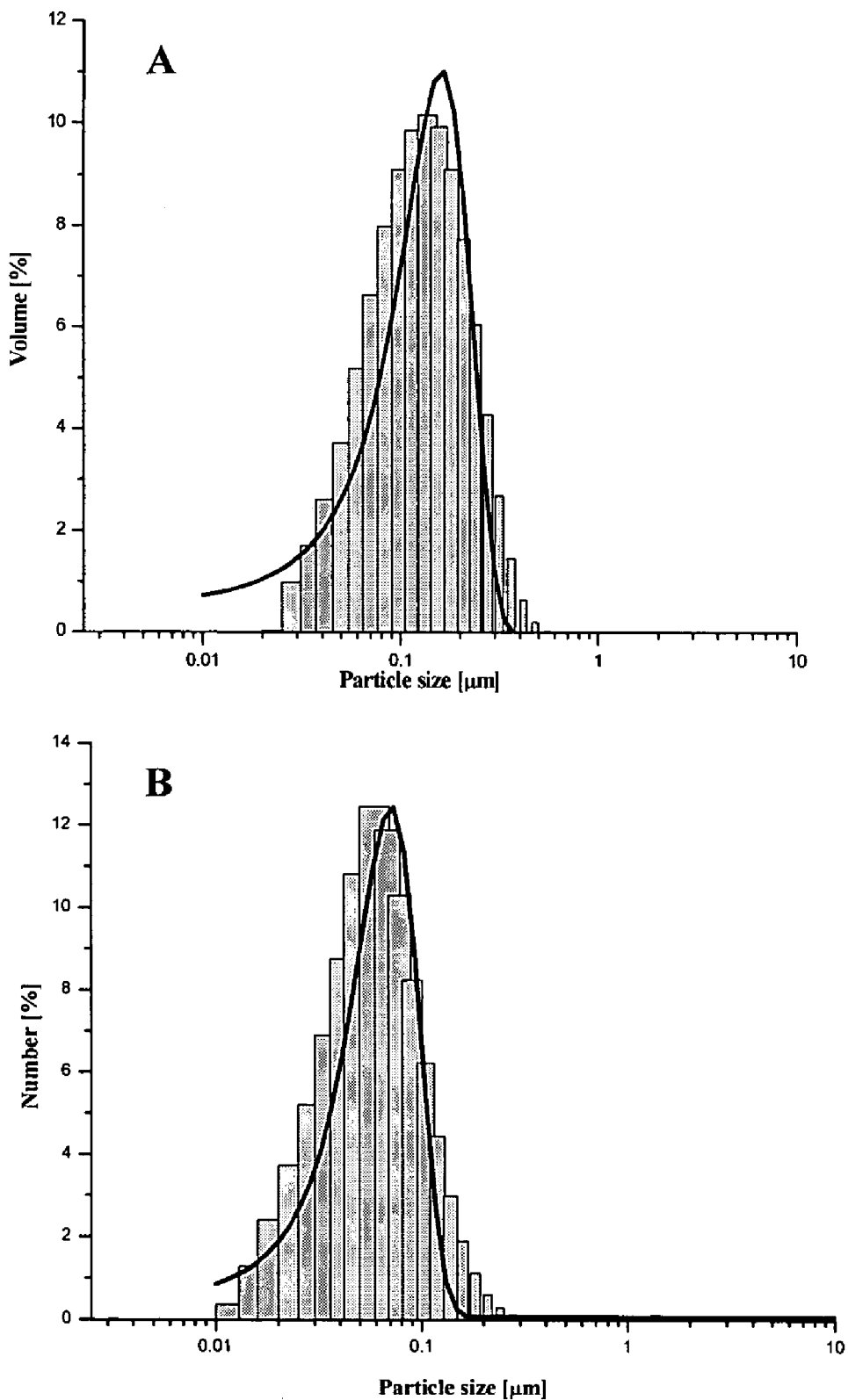
FIG. 3 illustrates the particle size distribution (PSD) of silver particles as number (%) (a) and volume (%) (b), obtained from 382 g $AgNO_3$ at a flow rate of the metallic precursor solution of 30 ml/min.

The metallic powders produced with the system of the present invention may also include ultra-fine metallic particles that have a low degree of agglomeration, as illustrated in FIG. 3. The degree of agglomeration may be expressed using the index of agglomeration $I_{aggl}$, which is the ratio between the average size distribution of the ultra-fine metallic particles ("PSD50%") and the average diameter of the particles. The average particle size distribution may be determined by any methods known in the art, including, but not limited to, dynamic light scattering (DLS), laser diffraction, and sedimentation methods, while the average particle size may be determined by averaging the diameter of the individual ultra-fine metallic particles obtained by, e.g., electron microscopy. An $I_{aggl}$ value of 1.0 indicates completely lack of agglomeration, while an increase in $I_{aggl}$ value indicates an increase in the degree of aggregation. In one embodiment, the powders of ultra-fine metallic particles of the present invention have an $I_{aggl}$ value of 1.2 or less.

Figure 4:
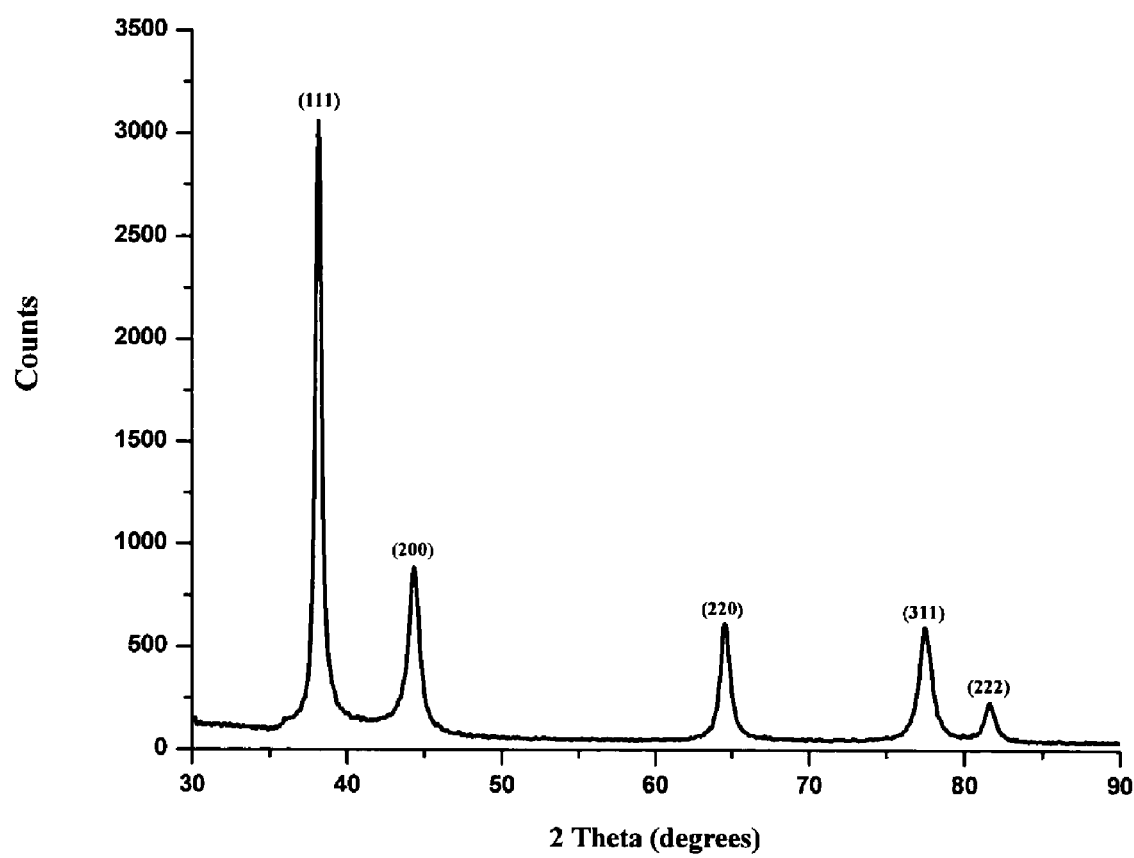

The metallic powders produced in accordance with the present invention may also include ultra-fine metallic particles that have a high degree of crystallinity. The term "degree of crystallinity," as used herein and in the appended claims, generally refers to the ratio between the size of the crystallites in the metallic powder and the diameter of the metallic particles. The size of the constituent crystallites may be deduced from XRD measurements using the Sherrer's equation, while the particle size may be determined by electron microscopy. A larger ratio of the size of the crystallites in comparison to the diameter of the metallic particles indicates an increased degree of crystallinity and a lower internal grain boundary surface. In one embodiment, the ultra-fine metallic particles have a high degree of crystallinity if at least about 80%, preferably, at least about 85%, more preferably, at least about 90-95%, and even more preferably, about 100% of the ultra-fine metallic particles of the present invention are highly crystalline. The high degree of crystallinity is reflected by the visible splitting of the peaks corresponding to the (220), (311), and (222) reflections in the XRD spectrum (see FIG. 4).

The ultra-fine metallic particles produced in accordance with the present invention may form a free flowing dry powder in which the majority of the individual particles may not be strongly attached to each other and may be readily re-dispersed in a liquid of choice.

In another embodiment of the present invention, the ultra-fine metallic particles forms stable dispersion when re-dispersed into a liquid, such as water, or an aqueous solution, where the majority of the individual particles may move substantially freely in the liquid in which they are dispersed. In one embodiment, the particle dispersion is stable for at least one week. In another embodiment, the particle dispersion is stable for 12 weeks.

The present invention further provides a substrate coated with a plurality of ultra-fine metallic particles, where the plurality of ultra-fine metallic particles have at least one desired feature, such as, tight size distribution, a low degree of agglomeration, a high degree of crystallinity, and oxidation resistance. The term "substrate" as used herein includes, without limitation, metallic subjects (e.g., metallic particles, flakes, tubes, and sheets), plastic materials, ceramic subjects, fibers, films, glasses, polymers, organic materials (e.g. resins), inorganic materials (e.g., carbon nanotubes), and any other object capable of being coated with the ultra-fine metallic particles produced in accordance with the present invention. The ultra-fine metallic particles may be the metallic particles of various metals, preferably, Cu, Pd, and Ag.

EXAMPLES

The following examples illustrate the present invention, which are set forth to aid in the understanding of the invention, and should not be construed to limit in any way the scope of the invention as defined in the claims which follow thereafter.

The ultra-fine silver, palladium and copper particles were prepared by reducing the metallic ammonium complex with D-glucose in the presence of gum arabic. The experimental set-up for these experiments is illustrated in FIG. 1.

Example 1

Materials

Silver nitrate ($AgNO_3$) was obtained from Ames Goldsmith Corp. (Glens Falls, N.Y.). Gum arabic was obtained from Frutarom Incorporated (North Bergen, N.J.). Ammonium hydroxide ($NH_4OH$) was purchased from Fischer Scientific Co. (Fair Lawn, N.J.). Acetone, ethanol, and sodium hydroxide (NaOH) solution (10 N) were supplied by Alfa Aesar (Ward Hill, Mass.). D-glucose was purchased from Avocado Research Chemicals Ltd. (Shore Road, Heyshane, Lancs.). Cupric nitrate hydrate [$Cu(NO_3)_2 2\frac{1}{2}H_2O$] was obtained from T.J. Baker Chemical Co. (Phillipsburg, N.J.), while the palladium nitrate solution 9.0% was obtained from Umicore (South Plainfield, N.J.).

Example 2

Preparation of Ultra-Fine Silver Particles (A) Preparation of the Reducing Solution 3 L deionised ("DI") water was heated to 55° C. in a 8 L stainless steel beaker. When the temperature reaches 55° C., 62.5 g gum arabic was slowly added into the water and dissolved by stirring the solution with a stirring propeller at low speed for 55 minutes. 36 g of D-glucose were then added to the solution. The mixture was stirred at 1700 rpm for 5 minutes.

(B) Preparation of Silver Ammonium Complex Solution 198.7 g $AgNO_3$ were dissolved in 234 ml DI water in a 2 L glass beaker. After the silver nitrate was completely dissolved, 195 ml ammonium hydroxide was added under stirring, followed by the addition of 291 ml DI water to reach a final volume of 720 ml.

(C) Preparation of Ultra-Fine Silver Particles

The reduction process was conducted by pumping the silver ammonium solution into the reducing solution at a flow rate of 8 ml/min using a peristaltic pump. When the addition of the silver complex solution is completed, the temperature was brought to 80° C. The process was conducted under continued stirring (1700 rpm).

(D) Hydrolysis of Gum Arabic

The excess of gum arabic was removed by increasing the pH of the dispersion to 11.5 with 10.0 N sodium hydroxide at the temperature of about 85° C. The dispersion was maintained in the condition for 2.5 hours.

(D) Processing the Silver Powder

When the hydrolysis of the gum was complete, the dispersion was allowed to cool and the silver particles to settle. The supernatant was then discarded and the silver particles were washed with water through 3 successive decantations. During the last wash, 50% ethanol (in DI water) was added to the settled metallic deposit instead of DI water. Two more washes with pure alcohol were performed. The powder was then dried overnight on filter paper at room temperature.

Example 3

Preparation of Ultra-Fine Palladium Particles (A) Preparation of the Reducing Solution A volume of 500 ml DI water was heated to 70° C. in 2 L glass beaker. When the temperature reaches 70° C., 10 g gum arabic was slowly added into the water and dissolved by stirring the solution. 100 g of D-glucose were then added to the solution and the mixture was stirred at 1700 rpm for 5 minutes. The pH of solution was adjusted at 10.5 with 10.0 N NaOH.

(B) Preparation of Palladium Ammonium Complex Solution 80 ml ammonium hydroxide was added quickly under stirring to 50 ml $Pd(NO_3)_2$ solution 9.0% in a 0.2 L glass beaker, followed by the addition of 50 ml DI water (final volume: 180 ml).

(C) Preparation of Ultra-Fine Palladium Particles

The reducing reaction was conducted by pumping the palladium ammonium solution to the reducing solution at a flow rate of 5 ml/min using a peristaltic pump. When the addition of the palladium complex solution is completed, the temperature was brought to 80° C. The process was conducted under continued stirring (1700 rpm).

The hydrolysis of gum arabic and the processing of palladium powder were carried out in a similar manner as in Example 2 (steps D and E).

Example 4

Preparation of Ultra-Fine Copper Particles

(A) Preparation of the Reducing Solution

A volume of 500 ml DI water was heated to 70° C. in 2 L glass beaker. When the temperature reaches 70° C., 25 g gum Arabic was slowly added into the water and dissolved by stirring the solution with a stirring propeller at 1700 rpm for 55 minutes. 100 g of D-glucose were then added to the solution and the mixture was stirred at 1700 rpm for 5 minutes. The pH of solution was adjusted at 10.5 with 10.0 N NaOH.

(B) Preparation of Copper Ammonium Complex Solution 18.2 g [$Cu(NO_3)_2 2\frac{1}{2}H_2O$] were dissolved in 50 ml DI water in a 0.2 L glass beaker. After the cupric nitrate was completely dissolved, 100 ml ammonium hydroxide was added quickly under stirring, followed by the addition of 50 ml DI water (overall volume: 200 ml).

(C) Preparation of Ultra-Fine Copper Particles

The reduction process was conducted by pumping the cupric ammonium solution to the reducing solution at a flow rate of 5 ml/min using a peristaltic pump. When the addition of the cupric complex solution is completed, the temperature was brought to 80° C. The process was conducted under continued stirring (1700 rpm). The remaining steps are similar to those of Example 2.

Discussed below are results obtained by the inventors in connection with the experiments of Example 1-4:

The size of the silver particles obtained did not undergo a substantial change when the process was scaled up by a factor of two or when the flow rate of the silver ammonium complex solution was raised to 30 ml/min from 8 ml/min, suggesting a minor impact of both parameters on the size of the particles formed. For all experiments the processing yield was >97%.

The experimental conditions and results of Example 2 are summarized in Table I.

While the foregoing invention has been described in some detail for purposes of clarity and understanding, it will be appreciated by one skilled in the art, from a reading of the disclosure, that various changes in form and detail can be made without departing from the true scope of the invention in the appended claims.

The invention claimed is:

1. A method for forming a plurality of ultra-fine metallic particles comprising:
    (a) obtaining a reducing solution comprising a reducing agent and a stabilizing agent;
    (b) obtaining a metal-ammonia solution comprising a metal-ammonia complex by reacting a metal nitrate with one of ammonium hydroxide and ammonia, wherein the reaction consists of water, the metal nitrate, and either the ammonium hydroxide or the ammonia, and further wherein said metal-ammonia solution is obtained under atmospheric pressure;
    (c) forming a reaction mixture comprising the reducing solution and the metal-ammonia solution;
    (d) maintaining the reaction mixture under a suitable condition for a time effective to reduce the metal-ammonia complex to metallic particles; and optionally,
    (e) isolating the metallic particles.

2. The method of claim 1, wherein the metal-ammonia complex is the complex of ammonia with one of a transition metal and a noble metal.

3. The method of claim 1, wherein the metal-ammonia complex is the complex of ammonia with a metal selected from the group consisting of Cu, Pd, and Ag.

4. The method of claim 1, wherein the reducing agent is a saccharide.

5. The method of claim 4, wherein the saccharide is an aldose.

6. The method of claim 5, wherein the aldose is glucose.

7. The method of claim 1, wherein the stabilizing agent is a water-soluble resin.

8. The method of claim 7, wherein the water-soluble resin is a naturally occurring water-soluble resin.

9. The method of claim 1, wherein the stabilizing agent is one of a gum arabic and a salt of naphthalene sulphonic-formaldehyde co-polymers.

10. The method of claim 1, wherein the stabilizing agent is removed during the isolation of the metallic particles.

11. The method of claim 1, wherein the stabilizing agent is removed through hydrolysis.

12. The method of claim 1, wherein the plurality of ultra-fine metallic particles has an average size of less than about 100 nm.

13. The method of claim 1, wherein the plurality of ultra-fine metallic particles has a tight size distribution.

14. The method of claim 13, wherein the plurality of ultra-fine metallic particles have a tight size distribution when at least about 80% of the plurality of ultra-fine metallic particles

TABLE I

| | | Reducing solution | | | Silver ammonium solution | | | | |
|---|---|---|---|---|---|---|---|---|---|
| Exp. | Bach size Ag (g) | Water (L) | Gum arabic (g) | Glucose (g) | Water (ml) | $AgNO_3$ (g) | $NH_4OH$ (ml) | Flow rate (ml/min) | Average size (nm) |
| 1 | 125 | 3 | 62.5 | 36 | 525 | 198.7 | 195 | 8 | ~70 |
| 2 | 245 | 4 | 120 | 69 | 775 | 382 | 390 | 8 | ~65 |
| 3 | 245 | 4 | 120 | 69 | 775 | 382 | 390 | 30 | ~65 | has a diameter within a range of N±15% N, wherein N is the average diameter of the plurality of ultra-fine metallic particles.

15. The method of claim 1, wherein the plurality of ultra-fine metallic particles has a high degree of crystallinity.

16. The method of claim 15, wherein at least about 80% of the plurality of ultra-fine metallic particles is highly crystalline.

17. The method of claim 15, wherein about 100% of the plurality of ultra-fine metallic particles is highly crystalline.

18. The method of claim 1, wherein the plurality of ultra-fine metallic particles has a low degree of agglomeration.

19. The method of claim 18, wherein the degree of agglomeration is measured with an Iaggl value and wherein the Iaggl of the plurality of ultra-fine metallic particles is less than about 1.2.

20. The method of claim 1, at least about 80% of the plurality of ultra-fine metallic particles is not irreversibly aggregated.

21. The method of claim 1, wherein the plurality of ultra-fine metallic particles when re-dispersed into a liquid forms dispersion which is stable for at least one week.

22. The method of claim 21, wherein the liquid is water.

23. The method of claim 22, wherein the dispersion is stable for 12 weeks.

* * * * *